(No Model.)

F. J. GAY.
EXPANSIBLE MANDREL.

No. 403,529. Patented May 21, 1889.

Witnesses:
W. H. Thurston
S. J. Murphy

Inventor,
Francis J. Gay

UNITED STATES PATENT OFFICE.

FRANCIS J. GAY, OF PROVIDENCE, RHODE ISLAND, ASSIGNOR TO THE BROWN & SHARPE MANUFACTURING COMPANY, OF SAME PLACE.

EXPANSIBLE MANDREL.

SPECIFICATION forming part of Letters Patent No. 403,529, dated May 21, 1889.

Application filed February 14, 1889. Serial No. 299,353. (No model.)

*To all whom it may concern:*

Be it known that I, FRANCIS J. GAY, of the city and county of Providence, in the State Rhode Island, have invented certain new and useful Improvements in Universal Holders for Milling and other Machines; and I do hereby declare the following specification, taken in connection with the accompanying drawings, forming a part of the same, to be a full, clear, and exact description thereof.

My invention relates to a holder for holding work to be operated upon by cutting or milling tools, and especially to that class of holders which are designed to hold work having a central hole—such, for instance, as a half clutch-box—which is to be cut upon its face. Heretofore work of this character has been held by means of an expansible bushing, through which was inserted a tapering plug provided on one end with a screw-thread and at the other with a slot for a screw-driver, this tapering plug being screwed into an ordinary holder and thereby expanding the bushing against the walls of the hole in the work into which the bushing was inserted. By this method it was difficult, if not practically impossible, to screw the parts up tight, and there was a constant tendency of the parts to work loose. Moreover, the entire arrangement was unhandy and inconvenient and necessitated the employment of a number of separate and disconnected parts.

The object of my invention is to overcome the difficulties referred to and to provide a holder which shall be positive and certain in its operation, and which shall at the same time be compact and easily manipulated; and the invention consists in the improved holder organized and constructed as hereinafter described.

Figure 1:
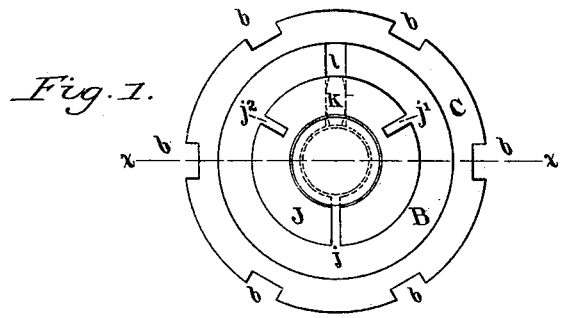
Figure 3:
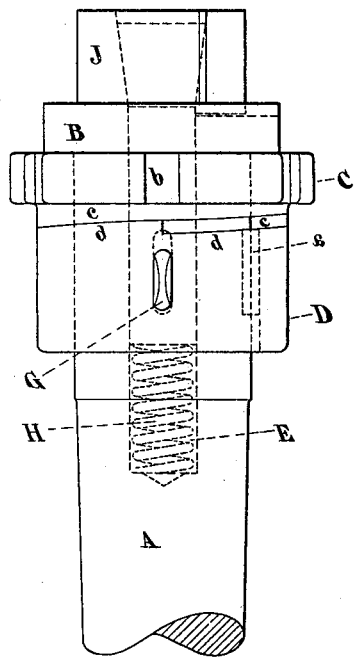
Figure 2:
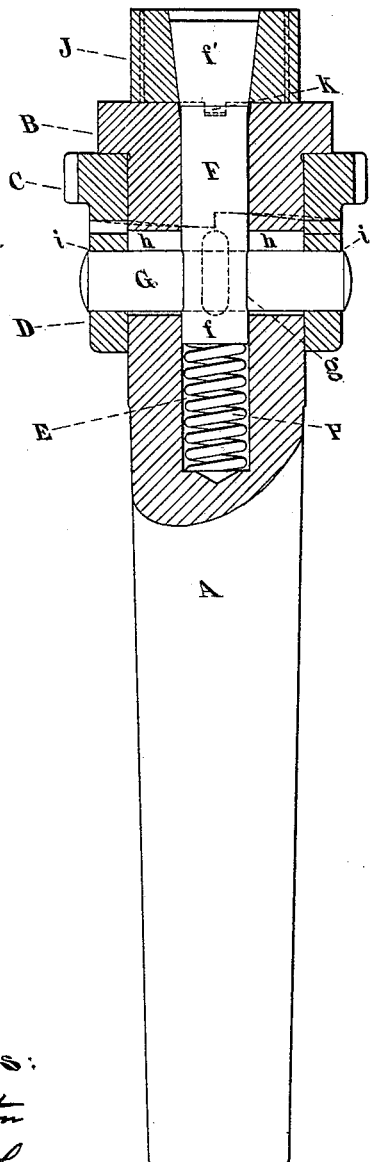

Referring to the drawings, Figure 1 is a front end view of my improved holder. Fig. 2 is a view, partly in section, taken on the line $x\,x$ of Fig. 1; and Fig. 3 is a side view at an angle of ninety degrees relatively to Fig. 2.

The holder has a shank, A, of suitable size and form to fit into the head of a milling-machine, or into the spindle of a lathe, as may be desired. This shank is provided at its end with a flange, B. Surrounding the shank below this flange are two collars, C and D. The collar D is secured to the shaft by a groove-and-spline connection, $a$, so that it may have a movement longitudinally on the shank, but be incapable of revolving thereon. The collar C is loose upon the shank, so that it can revolve thereon, and is provided with notches $b$ for applying a wrench to turn it.

The collar C is provided upon its lower face with two inclined planes, $c\,c$, each extending one-half of the way around the collar. The upper face of the collar D is provided with two corresponding inclined planes, $d\,d$, adapted to engage with the inclined planes $c\,c$ on the collar C, as shown in the drawings.

The flanged end of the shank A is provided with a central longitudinal bore, E, and into this bore is fitted a plug, F, which has a straight cylindrical shank, $f$, and is provided with a tapering head, $f'$. It is desirable that the cylindrical shank $f$ of this plug should be ground to nicely fit the bore E, in order that the work may be held accurately and chattering prevented. Through the shank $f$ of the plug F, near its lower end, is cut a transverse mortise, $g$. A corresponding transverse mortise, $h$, is also cut through the shank A, and mortises $i\,i$ are likewise cut through the walls of the collar D. A key, G, is inserted through all these mortises $g\,h\,i$, as shown in the drawings. This key G just fits the mortises $g$ and $i$ in the plug F and collar D, respectively, and thus firmly connects said plug and collar together; but the mortise $h$ in the shank A is made sufficiently longer than the width of the key G to give to the key a play in said mortise equal to the throw of the inclined planes upon the collars C and D. By this arrangement it will be seen that a revolution of the collar C will, by means of the inclined planes upon the contacting-faces of the collars C and D, give a longitudinal movement to the collar D along the shank A, and consequently a corresponding longitudinal movement to the plug F, such longitudinal movement being permitted by reason of the play of the key G in the mortise $h$.

In the bottom of the bore E is inserted a spring, H, against which the end of the plug F bears, said spring serving to return the plug to its normal position when the action of the inclined planes upon the collars C and D is released.

Surrounding the tapering head $f'$ of the plug F is an expansible bushing, J, provided with a tapering bore to fit the tapering head of the plug. To give to this bushing the requisite capacity for expansion, it is cut entirely through, as at $j$, and if the walls of the bushing are thick enough to require it additional partial cuts, as at $j'\ j^2$, may be made to permit the necessary expansibility. The lower end of this bushing is provided with a teat or projection, $k$, which takes into a slot, $l$, in the face of the flanged end of the shank to prevent the bushing from turning. The exterior diameter of the bushing is such that it will fit the hole in the article to be held, and to hold articles having different sizes of holes bushings of corresponding exterior diameters are to be employed.

To secure an article to be operated upon in the improved holder hereinbefore described, all that is necessary is to place the article onto the bushing J and turn the collar C. It is apparent that the turning of the collar C will cause the opposing inclined faces on the collars C and D to act upon each other, and thus give a longitudinal movement to the collar D, and a corresponding longitudinal movement to the plug F relatively to the bushing J, thereby causing the tapering head $f'$ of the plug to expand the bushing and force it into firm frictional contact with the walls of the hole in the work to be held. By reason of the slight slope and the long extent of surface of the inclined planes on the collars C and D great power is developed to expand the bushing, and the article to be operated upon is thereby firmly and accurately held, and the tendency to work loose under the operation of the cutting or milling tools is avoided. At the same time the holder is compact and easily manipulated, and by substituting bushings of different diameters can be employed for holding work having holes of different sizes.

If desired, a greater or less number of inclined planes upon the faces of the collars C and D may be employed; but I find in practice that the best results are obtained by having two inclined planes upon each collar, as shown.

The improved holder herein described, while especially designed for use in connection with the well-known universal milling-machine, can also be used in connection with any ordinary lathe, the shank of the holder being properly fitted to the spindle of the lathe. It is also obvious that while the holder is particularly adapted for holding articles to be operated upon by cutting or milling tools it may in some cases and for some purposes be employed for holding the cutting or milling tools themselves.

What I claim as my invention is—

In a universal holder, the combination, with a shank and expansible bushing connected thereto and a tapering plug for expanding the same, of two collars mounted upon the shank of said holder, the one so carried on the shank as to revolve upon the same against a shoulder on the shank, and the other connected with said plug so as to be incapable of revolution upon said shank, but so that it can slide thereon, the contacting faces of said collars being provided with inclined planes co-acting with each other, whereby the revolution of the loose collar will give a longitudinal movement to the other collar and to the tapering plug connected therewith, substantially as described.

FRANCIS J. GAY.

Witnesses:
W. H. THURSTON,
S. J. MURPHY.